(12) United States Patent
Cooksey (10) Patent No.: US 6,328,160 B1
(45) Date of Patent: Dec. 11, 2001

(54) EXPANDABLE COMPACT DISC SHIPPING CONTAINER

(76) Inventor: Edward Cooksey, P.O. Box 1492, Mitchellville, MD (US) 20716

(*) Notice: Subject to any disclaimer, the term of this patent is extended or adjusted under 35 U.S.C. 154(b) by 0 days.

(21) Appl. No.: 09/599,946

(22) Filed: Jun. 23, 2000

(51) Int. Cl.[7] .................................................. B65D 85/57
(52) U.S. Cl. ...................... 206/308.1; 206/224; 206/312; 229/103.3
(58) Field of Search ................... 206/308.1, 308.2, 206/311, 312, 424; 229/103.3

(56) References Cited

U.S. PATENT DOCUMENTS

| | | | |
|---|---|---|---|
| Re. 28,460 | * 7/1975 | Rous | 206/424 |
| Re. 30,163 | * 12/1979 | Meyer et al. | 206/424 |
| 2,945,616 | 7/1960 | Normandin . | |
| 2,945,617 | 7/1960 | Normandin . | |
| 3,279,594 | 10/1966 | Worthington . | |
| 3,414,185 | 12/1968 | Young . | |
| 3,552,640 | 1/1971 | Young . | |
| 3,648,923 | 3/1972 | Young . | |
| 3,817,445 | 6/1974 | Greason . | |
| 3,884,352 | * 5/1975 | Pilz, III et al. | 206/424 |
| 3,955,749 | 5/1976 | Turkenkopf . | |
| 3,985,230 | * 10/1976 | Meyer et al. | 206/424 |
| 4,160,503 | * 7/1979 | Ohlbach | 206/328 |
| 4,313,558 | 2/1982 | Benham . | |
| 4,331,290 | 5/1982 | Benham . | |
| 4,401,257 | 8/1983 | Benham . | |
| 5,064,114 | * 11/1991 | Cravens | 206/424 |
| 5,205,405 | * 4/1993 | O'Brien et al. | 206/310 |
| 5,366,074 | 11/1994 | O'Brien et al. . | |
| 5,372,253 | 12/1994 | O'Brien et al. . | |
| 5,398,866 | 3/1995 | Bluemle . | |
| 5,419,433 | 5/1995 | Harrer et al. . | |
| 5,421,453 | 6/1995 | Harrer et al. . | |
| 5,662,217 | 9/1997 | Durr . | |
| 5,682,990 | 11/1997 | Schluger . | |
| 5,772,022 | 6/1998 | Renna . | |
| 5,775,492 | 7/1998 | Ban . | |
| 5,799,862 | 9/1998 | Gray . | |
| 5,823,333 | * 10/1998 | Mori | 206/308.1 |
| 5,839,575 | 11/1998 | Blanco . | |
| 5,938,022 | * 8/1999 | Detloff | 206/308.1 |

* cited by examiner

Primary Examiner—Paul T. Sewell
Assistant Examiner—Jila M. Mohandesi
(74) Attorney, Agent, or Firm—Bradford E. Kile; Kile Goekjian Lerne & Reed PLLC (57) ABSTRACT

An expandable, compact disc shipping container capable of securely holding a compact disc container and additionally providing added protection to the corners of the compact disc container, which usually is most vulnerable to damage during shipping, and to the compact disc itself. The expandable, shipping container is provided with a top closure flap that is at least as long as the width of maximum expansion and further provided with score lines that facilitate assembly of a container blank and provide the ability to hold compact discs containers of varying thickness securely during shipment.

9 Claims, 4 Drawing Sheets

EXPANDABLE COMPACT DISC SHIPPING CONTAINER

BACKGROUND OF THE INVENTION

This invention relates to an improved system for packaging and shipping compact disc containers. The term compact disc (CD), in this application for patent, is intended to include an audio compact disc, a CD-ROM, a re-writable compact disc, a DVD format compact disc, and similar recording and storage medium discs. More particularly, this invention relates to a novel system for securing and restraining undesired movement of a compact disc container within a packaging container, which is likely to cause damage to either the container or the actual compact disc itself. This damage is typically located at the corners of the container where the compact disc container is prone to crack after a shock to the shipping container.

During 1982, compact discs were commercially introduced and revolutionized the music industry. The first compact discs introduced optical digital technology, which unlike analog technology (e.g., vinyl albums, cassettes, etc.) that employs mechanical means to read the information on the storage device, uses only light to touch and read a compact disc. Consequently, this method of reading causes no wear on the storage media. While the initial sound quality of analog may be superior to digital, over time, due to mechanical wear, the sound quality of analog media deteriorates. There is no corresponding deterioration in digital sound quality.

Following the success of audio compact discs, several variations have been introduced. For example, a CD-ROM (compact disc read-only memory), which is used primarily for reading by a computer was introduced. Eventually, formats were introduced that further allow a user to erase information stored on a disc and write new information. Finally, the DVD format was introduced. This format has become widely used for storing motion pictures having multiple channels (or tracks) containing a variety of related information and entertainment material.

When audio compact discs were first introduced, they were sold almost exclusively in retail music shops. The plastic cases used to house the compact disc, frequently referred to as jewel cases, served to display the compact disc and protect it from accumulation of foreign substances. Jewel cases are inexpensive, light weight, clear plastic containers, which are generally thin, rectangular shells with a central column to support a disc and a top panel hinged at one edge to open like a clamshell and provide access to the disc. The clear plastic shell is somewhat thin and delicate and the hinges, which are created by an interference fit, are easily damaged. These jewel cases were designed to stand up to in-store handling by shelf stockers and potential buyers. Jewel cases have generally been acceptable for these purposes. However, jewel cases and compact discs are no longer just handled in retail stores. With the boom of internet commerce and websites, online retailers such as Amazon.com, Cdnow.com, and others, more and more compact discs are being shipped, either through the United States Postal Service, United Parcel Service, FedEx, or the like. The light weight plastic jewel cases were not designed to withstand the type of shock associated with routine shipping and accordingly, breakage often occurs. Without adequate protection, the compact discs and especially their jewel case containers became subject to breakage during shipment.

Most companies that ship compact discs consider such breakage to be a cost of doing business and simply write-off the loss. However, this concession often results in the need to ship either a new jewel case container as a replacement or, in some instances, an entirely new compact disc and jewel case. This replacement process contributes to increased merchandise costs.

An alternative to accepting this type of product damage is to pack the compact disc containing jewel case more securely. Currently, this is accomplished through the use of various heavy, and somewhat expensive boxes. Moreover, additional shipping materials such as packing beads, or peanuts, are sometimes used. This results in a two-step packing process. Such a two-step process increases both labor and material costs. Additionally, different size compact discs may require different size boxes, or at least the use of more or less packing material.

Risks that are of particular concern are damage at the corners, where the container is particularly vulnerable, "windshield" cracking across the face of the case and accidental opening of the container during shipment which could cause the compact disc to be dislodged from its packaging and lose even the minimal amount of protection afforded by shipping containers known in the art.

The problems suggested in the foregoing are not intended to be exhaustive but rather are among several which may tend to reduce the effectiveness of compact disc shipping containers. Other noteworthy problems may also exist; however, those presented above should be sufficient to demonstrate that compact disc shipping containers appearing in the prior art will admit to worthwhile improvement.

OBJECTS AND SUMMARY OF THE INVENTION

Objects

It is a general object of the subject invention to provide a expandable shipping container for a compact disc that will obviate or minimize problems of the type previously discussed.

It is still another object of the subject invention to protect a compact disc from damage, such as cracking, during shipping.

It is a particular object of the subject invention to provide an expandable shipping container for a compact disc that is capable of securely receiving either a single or a double compact disc jewel case container with substantially equal security without altering the packing process.

It is another particular object of the subject invention to eliminate the requirement of separate packing materials, such as beads or peanuts.

It is a further object of the subject invention to enable customization of the placement of the creases and gussets to secure alternative compact disc shipping container to standard jewel cases.

BRIEF SUMMARY OF THE INVENTION

One preferred embodiment of the invention that is intended to accomplish at least some of the foregoing objects comprises 125 pound test, e-flute corrugated board that is stored flat and then facilely formed into an expandable shipping container to protect a single or double compact disc jewel case container or the like during shipping. The expandable shipping container has two sides that are substantially parallel and begin in a flat position. One side of the container is a single, continuous section of the corrugated board while the opposing section is separable at a seam longitudinally traversing the entire container. The container has two ends, a top and a bottom. The two ends are identical in all respects save one. The top end is additionally equipped with a closure flap that is longer than the width of the container at maximum expansion.

THE DRAWINGS

Other objects and advantages of the present invention will become apparent from the following detailed description of a preferred embodiment taken in conjunction with the accompanying designs wherein.

DETAILED DESCRIPTION OF A PREFERRED EMBODIMENT

Context of the Invention

Figure 1:
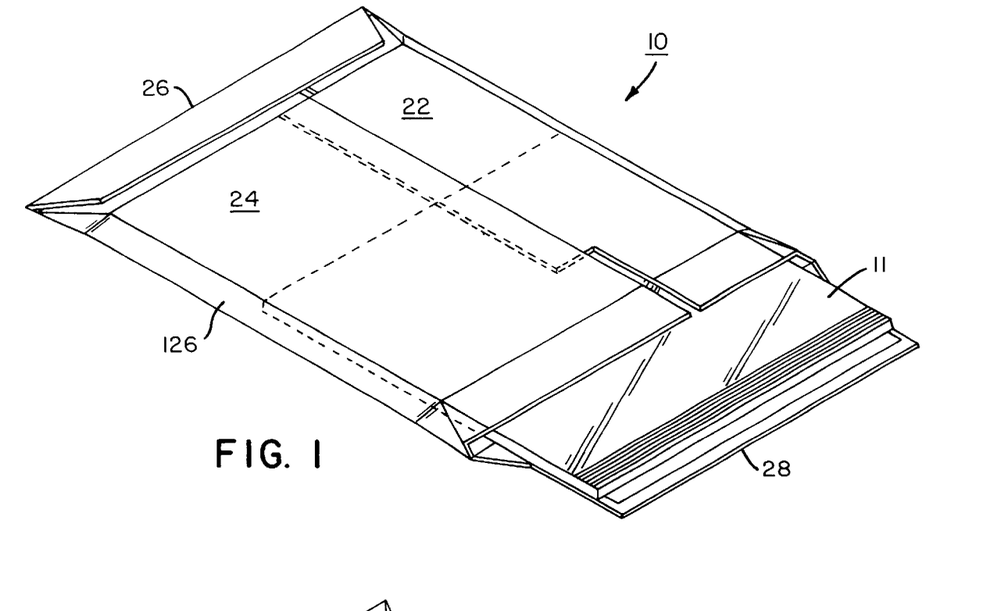
FIG. 1 is an axonometric view of an open, expandable shipping container, according to a preferred embodiment of the subject invention, expanding to receive a single compact disc jewel case through an open, top end.

FIG. 1 depicts an expandable shipping container 10 of the subject invention in an expanded state to receive a compact disc jewel case container 11. This FIGURE shows a preferred embodiment of the subject invention in use wherein the expandable compact disc shipping container is depicted in a first expanded state to securely receive a single compact disc jewel case. Additionally depicted in FIG. 1 is a bottom closure tab 26, a top closure flap 28 and a separable rear panel having a first rectangular rear panel segment 22 and a second rectangular rear panel segment 24. Also visible from this view is a second side panel 126.

Figure 2:
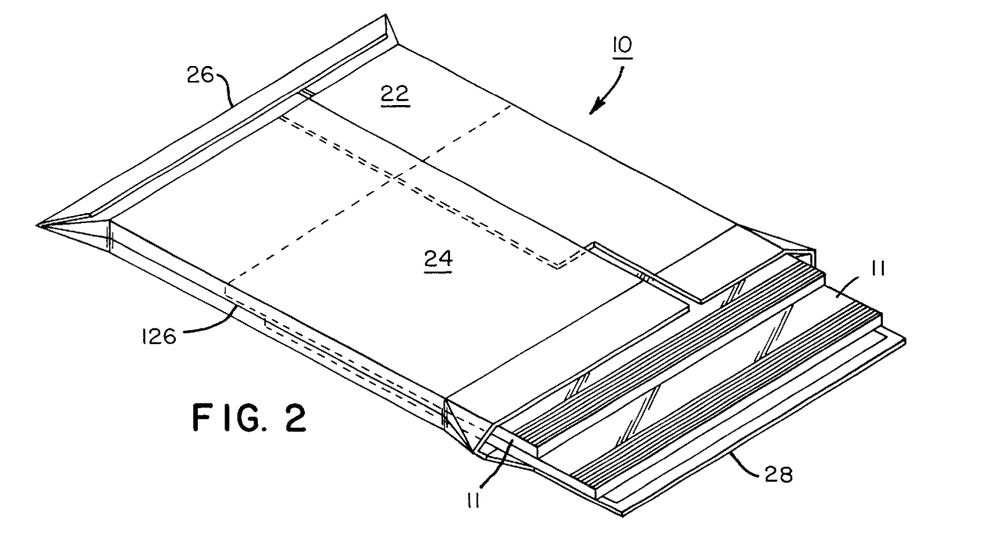
FIG. 2 is a similar axonometric view of the expandable shipping container depicted in FIG. 1 expanding to receive two compact disc jewel cases through the open, top end.

FIG. 2 depicts the same expandable shipping container 10 as depicted in FIG. 1 of the subject invention in a second expanded state to receive two compact disc jewel case containers 11. It should be noted that two CD jewel cases containers are depicted to represent a capability of the subject invention to facilely receive a double compact disc jewel case. FIG. 2 demonstrates the versatility of the subject invention in receiving and securing objects having a range in the dimension of thickness.

Expanded CD Shipping Container

Figure 3:
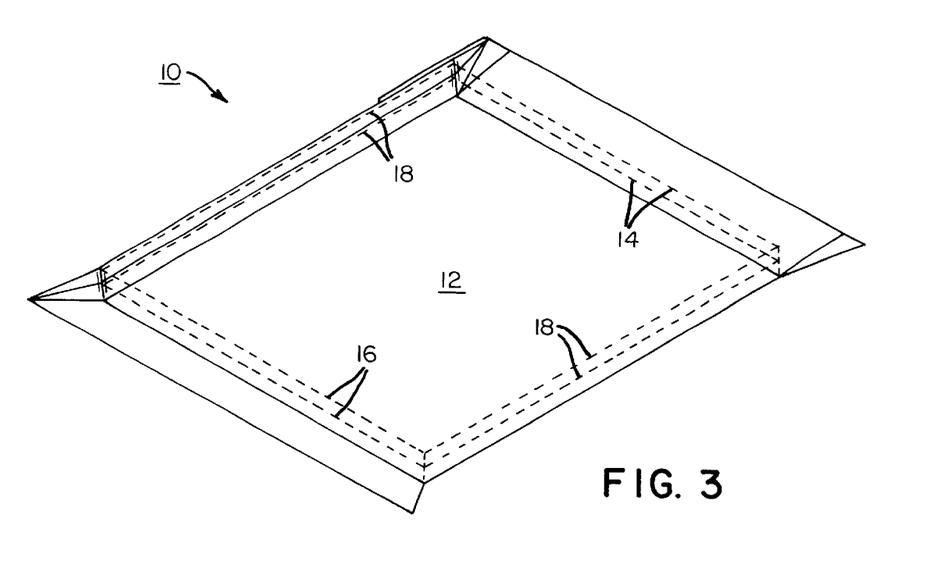
FIG. 3 is a front view of a closed, expandable shipping container depicting the continuous, front panel of the container and additionally showing the creases and the gussets which securley hold the CD contents of the shipping container.

Referring now particularly to FIG. 3, there is shown a front view of the subject invention, an expandable shipping container for a compact disc case 10. The invention may be used to secure and ship a single or double compact disc holder. More specifically, FIG. 3 depicts a view of the continuous, front panel 12 of the expandable shipping container 10 having top score lines 14, bottom score lines 16, and side score lines 18 intended to fit the object intended to be shipped securely.

Figure 4:
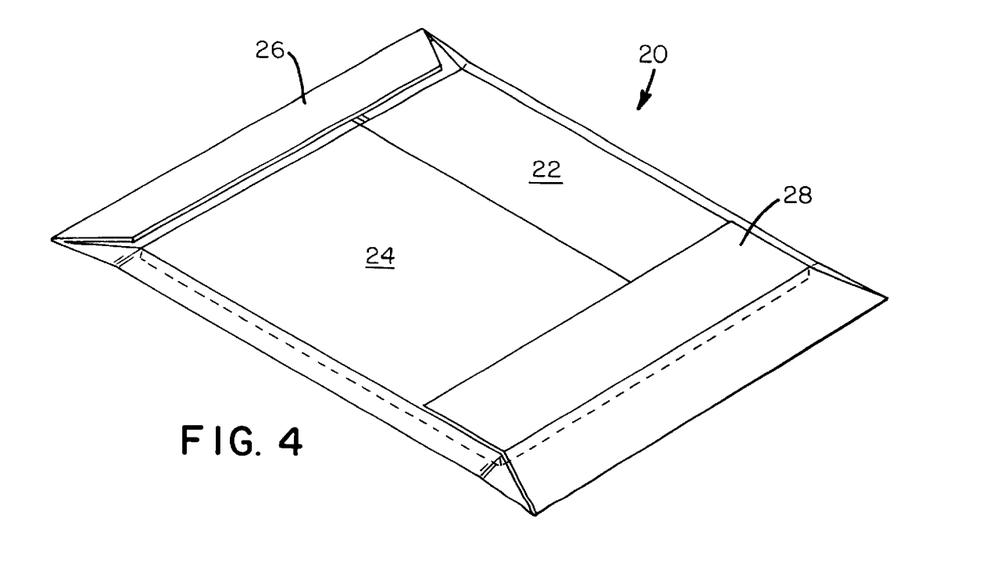
FIG. 4 is a rear view of a closed, expandable shipping container depicting a separable, rear panel, a seam running through the longest dimension of the container and further showing creases, gussets, and closure tabs located on the top and bottom ends and a closure flap located at the top end.

FIG. 4 depicts a rear view that discloses the side of the container opposite the continuous, front panel 12, the rear panel 20. The rear panel 20 is separable and is made up of a first rectangular rear panel segment 22 and a second rectangular rear panel segment 24. Additionally, FIG. 4 depicts a bottom tab closure 26 and a top tab closure 28, both in the closed position.

Figure 5:
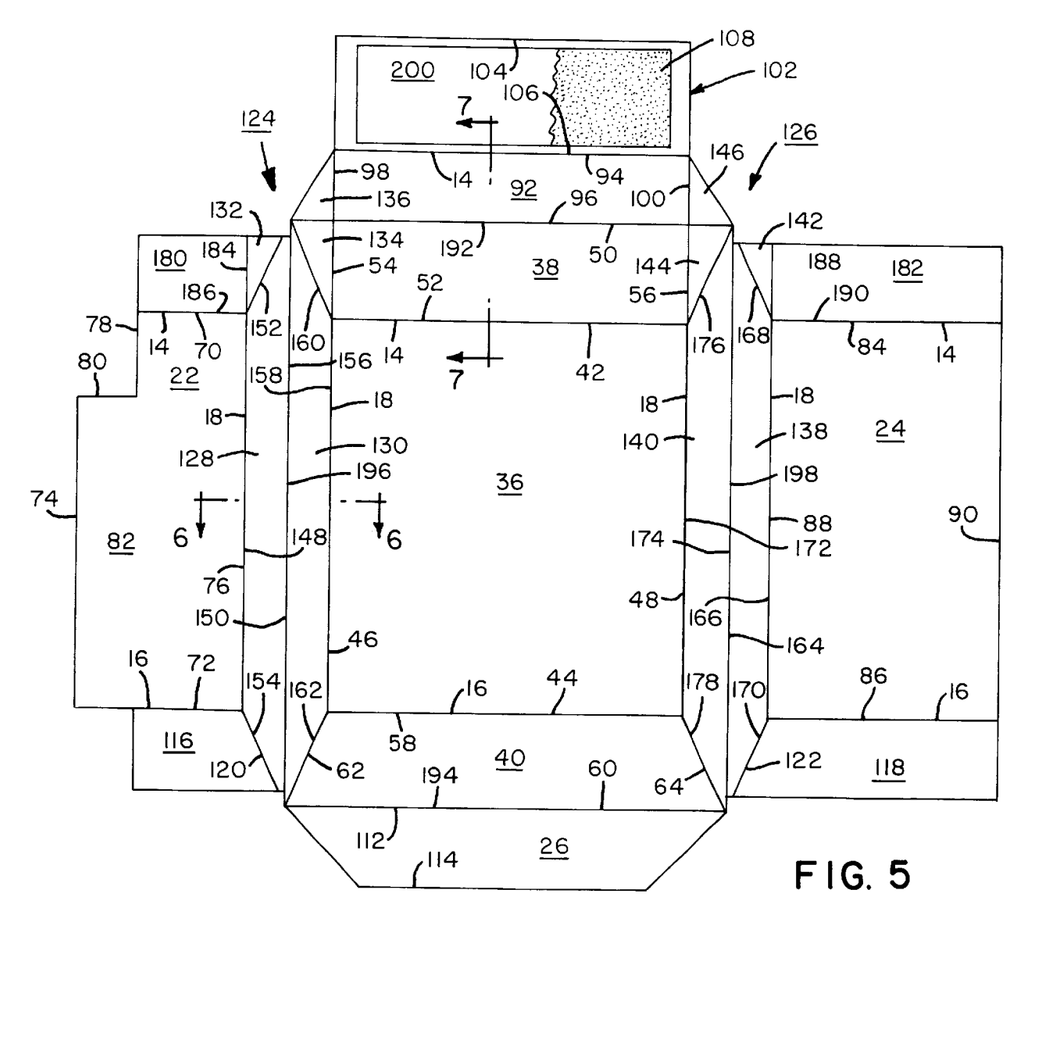
FIG. 5 depicts a flat view of the expandable shipping container in accordance with the subject invention prior to folding and affixing the base and lateral seam.

FIG. 5 depicts a container blank. A container of the subject invention is shown, folded open, prior to folding and forming into an expandable, shipping container. In a preferred embodiment of the subject invention, the material used to make the container is 125 pound, e-flute, corrugated board. This material provides maximum protection for the contents of the container while not adding significantly to the overall shipping weight.

Specifically, FIG. 5 shows each element of the shipping container that makes up the present invention. The continuous front panel is made up of a central object engaging portion 36, a top end portion 38, and a bottom end portion 40 and is shown generally in the center of the container blank. The central object engaging portion 36 has a top end 42, an opposing bottom end 44, a first side 46 and an opposing second side 48. As is shown in FIG. 5, the central object engaging portion is generally rectangular in shape.

The top end portion 38 is also a generally rectangular panel and has a top edge 50 and an opposing bottom edge 52, a first side 54 and an opposing second side 56. The bottom edge 52 of the top end portion 38 is integrally joined with the top end 42 of the central object engaging portion 36. The bottom end portion 40 is generally regular trapezoidal in shape and has a top edge 58, a parallel longer bottom edge 60, and first and second sloping sides 62 and 64 respectively. The top edge 58 of the bottom end portion is coextensive and integral with the bottom end 44 of the central object engaging portion 36.

Opposing the continuous, front panel is the separable, rear panel. The separable rear panel has two portions, a first rectangular rear panel segment 22 and a second rectangular rear panel segment 24. The first rectangular rear panel segment has a top edge 70 and an opposing bottom edge 72, a first side 74 and an opposing second side 76. Further, the first rectangular rear panel 22 has a generally rectangular notch cut out of the corner formed by the first side 74 and the top side 70 of the first rectangular rear panel segment 22. The notch has a side 78 and an adjacent end 80. Disposed between the end of the notch 80 and the bottom edge 72 of the first rectangular rear panel segment 22 and directly on the surface of the first rectangular rear panel segment 22 is a seal strip 82. The second rectangular rear panel segment 24 also has a top edge 84 and an opposing bottom edge 86, a first side 88 and an opposing second side 90.

Further depicted is a rectangular top front closure tab 92 with a top edge 94 and a parallel, opposing bottom edge 96, and a first side 98 and an opposing second side 100. The bottom edge of the top front closure tab 92 is integral and coextensive with the top edge 50 of the top end portion 38.

Further, a rectangular top closure flap 28 having a top edge 104 and a bottom edge 106 is shown. The bottom edge 106 of the top closure flap 28 is integral with the top edge 94 of the top front closure tab 92. The dimensions of the top closure flap 28 are relevant to the invention. The distance between the top edge 104 and the bottom edge 106 should be greater than the maximum expansion width of the shipping container. The maximum expansion width of the shipping container is determined by the distance between the nearer edge of the central object engaging portion 36 and either the first or the second rectangular rear panel segment, 22 or 24 respectively, which is the same. Disposed directly on the top closure flap is an adhesive 108 that binds the top closure flap to the first 22 and second 24 rectangular rear panel segments when the shipping container is in the closed position.

Next, a bottom closure tab 26 is shown. The bottom closure tab is a regular trapezoid and has a top edge 112 and a parallel shorter bottom edge 114. The top edge 112 of the bottom closure tab 26 is integral with the bottom edge 60 of the bottom end portion 40 of the first panel 12.

Additionally depicted are a first end seal strip 116, a second end seal strip 118, a first top rear closure tab 180, and a second top rear closure tab 182. The first end seal strip 116 is connected to the bottom edge 72 of the first rectangular rear panel segment 22 and has a sloping side portion 120. The second end seal strip 118 is connected to the bottom edge 86 of the second rear panel segment 24 and also has a sloping side portion 122. The first top rear closure tab 180 has a side edge 184, a bottom end 186. The bottom end 186 of the first top rear closure tab 180 is integrally connected to and coextensive with the top edge 70 of the first rectangular rear panel segment 22. The second top rear closure tab 182 has a side edge 188, a bottom end 190. The bottom end 190 of the second top rear closure tab 182 is integrally connected to and coextensive with the top edge 84 of the second rectangular rear panel segment 24.

A first side panel 124 extends between and interconnects the first side 46 of the central object engaging portion 36 of the front panel 12 and the second side 76 of the first rear panel segment 22. A second side panel 126 extends between and interconnects the second side 48 of the central object engaging portion 36 of the front panel 12 and the first side 88 of the second rear panel segment 24.

The first side panel 124 is formed by a first side panel first trapezoidal side portion 128, a first side panel second trapezoidal side portion 130, a first side panel, first trapezoidal side portion corner forming gusset 132, a first side panel, second trapezoidal side portion corner forming gusset 134, and a first side top closure tab gusset 136.

The second side panel 126 is formed by a second side panel first trapezoidal side portion 138, a second side panel second trapezoidal side portion 140, a second side panel, first trapezoidal side portion corner forming gusset 142, a second side panel, second trapezoidal side portion corner forming gusset 144, and a second side top closure tab gusset 146.

The first side panel first trapezoidal side portion 128 is generally regular trapezoidal in shape and has a first side 148, a parallel longer second side 150, and sloping top and bottom sides 152 and 154 respectively. The first side 148 of the first side panel first trapezoidal side portion 128 connects the second side 76 of the first rectangular rear panel segment 22. The sloping bottom side 154 is coextensive and integral with the sloping side 120 of the first end seal strip 116 while the sloping top side 152 is coextensive and integral with the first side panel first trapezoidal side portion corner forming gusset 132. The first side panel first trapezoidal side portion corner forming gusset 132 is additionally connected to the second side 76 of the first rectangular rear panel segment 22.

The first side panel second trapezoidal side portion 130 is generally regular trapezoidal in shape and has a first side 156, a parallel shorter second side 158, and sloping top and bottom sides 160 and 162 respectively. The first side 156 of the first side panel second trapezoidal side portion 130 is connected to the second side 150 of the first side panel first trapezoidal side portion 128 and the second side 158 of the first side panel second trapezoidal side portion 130 is connected to first side 46 of the central object engaging portion 36. The sloping bottom side 162 is coextensive and integral with the first side 62 of the bottom end portion 40 while the sloping top side 160 is coextensive and integral with the first side panel second trapezoidal side portion corner forming gusset 134. The first side panel second trapezoidal side portion corner forming gusset 134 is additionally connected to the first side 54 of the top end portion 38. The first side panel is completed by the first side top closure tab gusset 136, which is connected to the first side panel second trapezoidal side portion corner forming gusset 134 and the first side 98 of the top front closure tab 92.

The second side panel first trapezoidal side portion 138 is generally regular trapezoidal in shape and has a first side 164, a parallel shorter second side 166, and sloping top and bottom sides 168 and 170 respectively. The second side 166 of the second side panel first trapezoidal side portion 138 is connected to the first side 88 of the second rectangular rear panel segment 24. The sloping bottom side 170 is coextensive and integral with the sloping side 122 of the second end seal strip 118 while the sloping top side 168 is coextensive and integral with the second side panel first trapezoidal side portion corner forming gusset 142. The second side panel first trapezoidal side portion corner forming gusset 142 is additionally connected to the first side 88 of the second rectangular rear panel segment 24.

The second side panel second trapezoidal side portion 140 is generally regular trapezoidal in shape and has a first side 172, a parallel longer second side 174, and sloping top and bottom sides 176 and 178 respectively. The first side 172 of the second side panel second trapezoidal side portion 140 is connected to the second side 48 of the of the central object engaging portion 36 and the second side 174 of the second side panel second trapezoidal side portion 140 is connected to the first side 164 of the second side panel first trapezoidal side portion 138. The sloping bottom side 178 is coextensive and integral with the second side 64 of the bottom end portion 40 while the sloping top side 176 is coextensive and integral with the second side panel second trapezoidal side portion corner forming gusset 144. The second side panel second trapezoidal side portion corner forming gusset 144 is additionally connected to the second side 56 of the top end portion 38. The second side panel is completed by the second side top closure tab gusset 146, which is connected to the second side panel second trapezoidal side portion corner forming gusset 144 and the second side 100 of the top front closure tab 92.

In a preferred embodiment of the subject invention, various score lines are provided on the shipping container at predetermined locations. The purpose of these score lines is two-fold. The score lines facilitate folding during assembly and further, assist in the secure handling of the contents of the shipping container. Side score lines 18 are formed along each of the edges of first side panel first trapezoidal side portion 128, first side panel second trapezoidal side portion 130, second side panel first trapezoidal side portion 138, and second side panel second trapezoidal side portion 140.

In addition to following the entire outline of the first side panel first trapezoidal side portion 128, the score line formed at the first side 148 of first side panel first trapezoidal side portion 128 additionally extends from the start of the sloping top edge 152 in a straight line toward the top of the container and forms the edge between first top rear closure tab 180 and first side panel first trapezoidal side portion corner forming gusset 132. The score line formed at the second side 158 of the first side panel second trapezoidal side portion 130 additionally extends from the start of the sloping top edge 160 in a straight line toward the top of the container and forms the edge between first side panel second trapezoidal side portion corner forming gusset 134 and the first side 54 of the top end portion 38, as well as forming the edge between the first side top closure tab gusset 136 and the first side 98 of the top front closure tab 92.

In addition to following the entire outline of the second side panel first trapezoidal side portion 138, the score line formed at the second side 166 of second side panel first trapezoidal side portion 138 additionally extends from the start of the sloping top edge 168 in a straight line toward the top of the container and forms the edge between second top rear closure tab 182 and the second side panel first trapezoidal side portion corner forming gusset 142. The score line formed at the first side 172 of the second side panel second trapezoidal side portion 140 additionally extends from the start of the sloping top edge 176 in a straight line toward the top of the container and forms the edge between second side panel second trapezoidal side portion corner forming gusset 144 and the second side 56 of the top end portion 38, as well as the edge between the second side top closure tab gusset 146 and the second side 100 of the top front closure tab 92.

Top score lines 14 are also positioned along the top of the shipping container and bottom score lines 16 are positioned along the bottom of the shipping container. The top and bottom score lines 14 and 16 function to hold the compact disc container securely. It is contemplated that the dimensions of these score lines may be modified to accommodate similar compact disc packages of varying dimensions such as a DVD.

Finally, a top closure score line 192 and a bottom closure score line 194 are positioned between the top front closure tab 92 and the top end portion 38 and between the bottom closure tab 26 and the bottom end portion 40, respectively. A first side closure score line 196 and a second side closure score line 198 are disposed between the first side panel first trapezoidal side portion 128 and the first side panel second trapezoidal side portion 130 and between the second side panel first trapezoidal side portion 138 and the second side panel second trapezoidal side portion 140, respectively.

Figure 6:
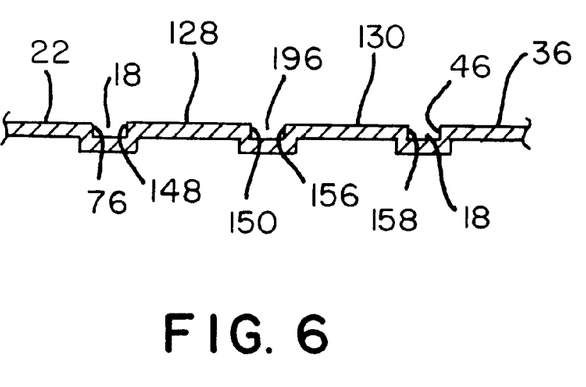
FIG. 6 is an enlarged cross-sectional view of the disassembled, expandable shipping container depicting the indented nature of the creases formed in a side panel of the container.
Figure 7:
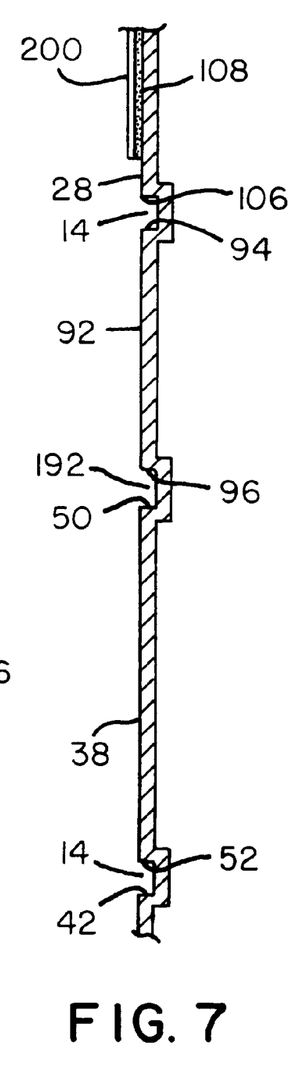
FIG. 7 is an enlarged cross-sectional view of the disassembled, expandable shipping container depicting the intended nature of the creases forming the top end including the top closure flap.

As shown in greater detail in FIGS. 6 and 7, the score lines described above are formed by two parallel edges having a valley therebetween. In a preferred embodiment of the present invention, predetermined score lines may have a valley having a width twice that of other score lines.

To use the subject invention, the container blank as depicted in FIG. 5 must be folded so as to form the compact disc shipping container of the present invention. This assembly is accomplished by reverse folding the first rectangular rear panel segment 22 along a score line 196 between the first side panel first trapezoidal side portion 128 and first side panel second trapezoidal side portion 130 so that the first rectangular rear panel segment 22 partially overlays the central object engaging portion 36 of the front panel 12. Additionally, the second rectangular rear panel segment is reverse folded along the score line 198 between the second side panel first trapezoidal side portion 138 and the second side panel second trapezoidal side portion 140 so that the second rectangular rear panel segment 24 partially overlays the central object engaging portion 36 of the front panel 12. Then, the seal strip 82 on the first rectangular rear panel segment 22 is adhered to the second rectangular rear panel segment 24.

Next, the bottom closure tab 26 is reverse folded along the score line 194 between the bottom end portion 40 and the bottom closure tab 26 so it partially overlays the bottom end portion 40. Then, the bottom closure tab 26 is adhered to the first end seal strip 116 and the second end seal strip 118 to form an expandable shipping container.

The adhesive 108, located on the top closure flap 28 may be a glue white resin, or other suitable adhesive for creating a bond between two pieces of corrugated board. The adhesive 108 is covered by a peel-away layer 200 that is removed just prior to final closure of the container. This peel-away layer 200 is intended to facilitate ease of use of the container.

FIG. 6, depicts a section view taken along section line 6—6 from FIG. 5, and more particularly shows the score lines and valleys of the first and second side panels. Specifically, three score lines are shown enlarged to show greater detail. The first score line 18 is formed between the second side 76 of the first rectangular rear panel segment 22 and the first side 148 of the first side panel first trapezoidal side portion 128. The second score line 196 is formed between the second side 150 of the first side panel first trapezoidal side portion 128 and the first side 156 of the first side panel second trapezoidal side portion 130. The third score line 18 is formed between the second side 158 of the first side panel second trapezoidal side portion 130 and the first side 46 of the central object holding portion 36. It is the use of these score lines that facilitates construction of the shipping container from a blank and, more importantly, secures the object to be shipped.

FIG. 7, depicts a section view taken along section line 7—7 from FIG. 5, and more particularly shows the three score lines and valleys between the central object engaging portion 36, the top end portion 38, the top front closure tab 92, and the top closure flap 28. This FIGURE is an enlarged view to show greater detail. The first score line 14 is formed between the top end 42 of the central object engaging portion 36 and the bottom end 52 of the top end portion 38. The second score 192 is formed top end 50 of the top end portion 38 and the bottom end 96 of the top front closure tab 92. The third score line 14 is formed between the top end 94 of the top front closure tab 92 and the bottom end 106 of the top closure flap 28. Further depicted in FIG. 7 is the adhesive 108 and the peel away layer 200 covering the adhesive.

Having described in detail a preferred embodiment of the invention, it may be useful to briefly set forth some of the major advantages of the invention.

SUMMARY OF MAJOR ADVANTAGES OF THE INVENTION

This subject invention provides an expandable shipping container, which provides protection to either a single or a double compact disc jewel case container, particularly at the corners where the jewel case container and the compact disc itself are most vulnerable. More specifically, when the CD or double CD jewel case container is inserted into the shipping container the front and back panels separate, the sidewalls expand and move inwardly. The corners, however, remain fixed and as a result project outwards with respect to the side panels to provide extra protection at the corners of the CD jewel case container.

This invention further provides for ease in assembly and additional security in position of the compact disc container in transport by providing score lines at appropriate, predetermined positions.

The front and back panels have score lines that are substantially the same rectangular configuration as the CD jewel case container, which provides a particular advantage of the subject invention, snuggly securing a compact disc container in a fixed location within the container. The subject container has expandable side walls that permit a range in the dimension of thickness.

Another significant advantage of the subject invention is ability to protect the corners of the compact disc jewel case through use of outwardly extending gussets at each corner.

In describing the invention, reference has been made to a preferred embodiment. Those skilled in the art, however, and familiar with the disclosure of the subject invention, may recognize additions, deletions, substitutions, modifications and/or other changes that will fall within the purview of the invention as defined in the following claims.

What is claimed is:

1. An expandable compact disc shipping container comprising:
   a front panel, said front panel having
      a central object engaging portion having a top end and an opposing bottom end and a first side and an opposing second side collectively defining a generally rectangular configuration,
      a top end portion comprising a rectangular panel having a top edge and a bottom edge wherein said bottom edge is integrally joined with said top end of said central object engaging portion, and
      a bottom end portion comprising a regular trapezoid having a top edge, a parallel longer bottom edge, and first and second sloping side edges wherein the top edge is coextensive and integral with said bottom end of said central object engaging portion;
   a rear panel comprising two portions
      a first rectangular rear panel segment having a top edge and a bottom edge,
      a second rectangular rear panel segment having a top edge and a bottom edge,
      a generally rectangular notch cut from the corner of the first rectangular rear panel segment formed by said first side and said top edge, said notch having a side and an adjacent end, and
      a generally rectangular seal strip between said end of said notch and said bottom edge of said first rectangular rear panel segment and directly on the surface thereof;
   a first end seal strip connected to said bottom edge of said first rear panel segment, said first end seal strip having a sloping side portion;
   a second end seal strip connected to said bottom edge of said second rear panel segment, said second end seal strip having a sloping side portion;
   a first rear top closure tab having a side edge and a bottom edge, wherein the bottom edge is coextensive and integral with said top edge of said first rectangular rear panel segment;
   second rear top closure tab having a side edge and a bottom edge, wherein the bottom edge is coextensive and integral with said top edge of said second rectangular rear panel segment;
   a bottom closure tab comprising a regular trapezoid having a top edge and a parallel shorter bottom edge wherein said top edge is integral with said bottom edge of said bottom end portion of said first panel;
   a front top closure tab comprising a rectangular panel having a top edge and a parallel, opposing bottom edge and a first side and a second side, wherein said bottom edge is integral with said top edge of said top end portion;
   a top closure flap comprising a rectangular panel having a top edge and a bottom edge wherein said bottom edge is integral with said top edge of said top closure tab;
   a first side panel extending between and interconnecting said first side of said central object engaging portion and said second side of said first rear panel segment said first side panel comprising
      a first side panel first trapezoidal side portion being generally rectangular and having a first side, a parallel longer second side, and sloping top and bottom sides, wherein said first side is integral with said second side of said first rectangular rear panel segment and said sloping bottom side is coextensive and integral with said sloping side of said first end seal strip,
      a first side panel second trapezoidal side portion being generally rectangular and having a first side, a parallel shorter second side, and sloping top and bottom sides, wherein said first side is integral with said second side of said first side panel first trapezoidal side portion, said second side is integral with said first side of said central object engaging portion, and said sloping bottom side is coextensive and integral with said first side of said bottom end portion,
      a first side panel, first trapezoidal side portion corner forming gusset connected between said sloping top side of said first side panel first trapezoidal side portion and said side edge of said first rear top closure tab,
      a first side panel, second trapezoidal side portion corner forming gusset connected between said sloping top side of said first side panel second trapezoidal side portion and said first side of said top end portion, and
      a first side top closure tab gusset connected between said first side panel, second trapezoidal side portion corner forming gusset and said first side of said top front closure tab;
   a second side panel extending between and interconnecting said second side of said central object engaging portion and said first side of said second rear panel segment said second side panel comprising
      a second side panel first trapezoidal side portion being generally rectangular and having a first side, a parallel shorter second side, and sloping top and bottom sides, wherein said second side is integral with said first side of said second rectangular rear panel segment and said sloping bottom side is coextensive and integral with said sloping side of said second end seal strip,
      a second side panel second trapezoidal side portion being generally rectangular and having a first side, a parallel longer second side, and sloping top and bottom sides, wherein said second side is integral with said first side of said second side panel first trapezoidal side portion, said first side is integral with said second side of said central object engaging portion, and said sloping bottom side is coextensive and integral with said second side of said bottom end portion, a second side panel, first trapezoidal side portion corner forming gusset connected between said sloping top side of said second side panel first trapezoidal side portion and said side edge of said second rear top closure tab,
      a second side panel, second trapezoidal side portion corner forming gusset connected between said sloping top side of said second side panel second trapezoidal side portion and said second side of said top end portion, and a second side top closure tab gusset connected between said second side panel, second trapezoidal side portion corner forming gusset and said second side of said top front closure tab; and wherein said first rectangular rear panel segment is operably reverse folded along an edge formed between said first side panel, first rectangular side portion and said first side panel, second rectangular side portion to partially overlay said central object engaging portion of said front panel and said second rectangular rear panel segment is operably reverse folded along an edge formed between said between said second side panel, first rectangular side portion and said second side panel, second rectangular side portion to partially overlay said central object engaging portion of said front panel, and said generally rectangular seal strip is adhered to said second rectangular rear panel segment and said bottom closure tab is operably reverse folded along an edge formed between said bottom end portion and said bottom closure tab to partially overlay said bottom end portion and said bottom closure tab is adhered to said first end seal strip and said second end seal strip to form an expandable compact disc shipping container.

2. The expandable compact disc shipping container as recited in claim 1 further comprising:

a plurality of side score lines formed along each of the edges of said first side panel first trapezoidal side portion, said first side panel second trapezoidal side portion, said second side panel first trapezoidal side portion, said second side panel second trapezoidal side portion, said side score lines further formed along each edge, being integrally connected with another portion of said shipping container and extending in the direction of the longest dimension of said shipping container, of said first and second side panel, first and second trapezoidal side portion corner forming gussets and said first and second side top closure tab gussets;

a plurality of top score lines formed between said top edge of said first rectangular rear panel segment and said bottom edge of said first rear top closure tab, between said top end of said central object engaging portion and said bottom edge of said top end portion, between said top edge of said top front closure tab and said bottom edge of said top closure flap, and between said top edge of said second rectangular rear panel segment and said bottom edge of said second rear top closure tab;

a plurality of bottom score lines formed between said bottom edge of said first rectangular rear panel segment and said top edge of said first end seal strip, between said bottom end of said central object engaging portion and said top edge of said bottom end portion, and between said bottom edge of said second rectangular rear panel segment and said top edge of said second end seal strip;

a top closure score line formed between said top front closure tab and said top end portion, and extending between said first side panel, second trapezoidal side portion corner forming gusset and said second side top closure tab gusset, and further extending between said second side panel, second trapezoidal side portion corner forming gusset and said second side top closure tab gusset;

a bottom closure score line formed between said bottom closure tab and said bottom end portion;

a first side closure score line disposed between said first side panel first trapezoidal side portion and said first side panel second trapezoidal side portion; and a second side closure score line disposed between said second side panel first trapezoidal side portion and said second side panel second trapezoidal side portion.

3. The expandable compact disc shipping container as recited in claim 2 wherein said score lines further comprise:

double score lines having parallel edge portions and a valley between said edge portions.

4. The expandable compact disc shipping container as recited in claim 1 wherein:

the thickness of the expandable compact disc shipping container is at least 125 pound test, e-flute corrugated board.

5. The expandable compact disc shipping container as recited in claim 2 wherein said score lines further comprise:

said valley having a double width.

6. The expandable compact disc shipping container as recited in claim 1 wherein:

said top closure flap has a length greater than the width of said first or second side panel.

7. The expandable compact disc shipping container as recited in claim 2 wherein:

said score lines outlining said central object engaging portion substantially conform to the dimensions of the object to be shipped.

8. The expandable compact disc shipping container as described in claim 1 wherein:

the expandable compact disc shipping container is operable to receive a single compact disc case.

9. The expandable compact disc shipping container as described in claim 1 wherein:

the expandable compact disc shipping container is operable to receive a double compact disc case.

* * * * *